US009258174B1

(12) United States Patent
Gerstel et al.

(10) Patent No.: US 9,258,174 B1
(45) Date of Patent: Feb. 9, 2016

(54) SERVER-LAYER PATH NEGOTIATION BETWEEN CLIENT AND SERVER NETWORK LAYERS

(71) Applicants: Ornan Alexander Gerstel, Herzelia (IL); Zafar Ali, Hicksville, NY (US); Walid Wakim, Aurora, IL (US); Clarence Filsfils, Brussels (BE)

(72) Inventors: Ornan Alexander Gerstel, Herzelia (IL); Zafar Ali, Hicksville, NY (US); Walid Wakim, Aurora, IL (US); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 113 days.

(21) Appl. No.: 13/802,053

(22) Filed: Mar. 13, 2013

(51) Int. Cl.
| | |
|---|---|
| G06F 15/16 | (2006.01) |
| H04L 29/06 | (2006.01) |
| H04Q 11/00 | (2006.01) |
| H04J 14/02 | (2006.01) |
| H04L 12/701 | (2013.01) |

(52) U.S. Cl.
CPC ....... *H04L 29/06537* (2013.01); *H04J 14/0227* (2013.01); *H04J 14/0267* (2013.01); *H04L 45/00* (2013.01); *H04Q 11/0062* (2013.01)

(58) Field of Classification Search
CPC . H04Q 11/0062; H04L 45/00; H04J 14/0227; H04J 14/0267
USPC .......................................... 709/202, 238–242
See application file for complete search history.

(56) References Cited

U.S. PATENT DOCUMENTS

| | | | |
|---|---|---|---|
| 6,404,738 B1 * | 6/2002 | Reininger et al. | 370/236 |
| 2007/0053363 A1 * | 3/2007 | Chen et al. | 370/395.21 |
| 2007/0121635 A1 * | 5/2007 | Zhou et al. | 370/392 |
| 2010/0182912 A1 * | 7/2010 | Hongisto et al. | 370/242 |
| 2010/0183308 A1 * | 7/2010 | Gerstel et al. | 398/79 |
| 2011/0113480 A1 * | 5/2011 | Ma et al. | 726/9 |
| 2012/0221624 A1 | 8/2012 | Gerstel et al. | |
| 2012/0224506 A1 * | 9/2012 | Gredler et al. | 370/254 |

OTHER PUBLICATIONS

Vasseur et al., "Path Computation Element (PCE) Communication Protocol (PCEP)," RFC 5440, The Internet Society, Reston, VA, USA, Mar. 2009 (eighty-seven pages).

(Continued)

*Primary Examiner* — Hitesh Patel
*Assistant Examiner* — Joseph Maniwang
(74) *Attorney, Agent, or Firm* — The Law Office of Kirk D. Williams

(57) ABSTRACT

In one embodiment, negotiation is performed between the client-layer (e.g., Layer-3 or Layer-2) network and the server-layer (e.g., optical) network to establish a path through the server-layer network with desired server-layer characteristics. This negotiation may include a first iteration of a client-layer request of one or more first server-layer characteristics followed by a negative server-layer response, and a subsequent iteration of a particular client-layer request of one or more particular server-layer characteristics followed by a positive server-layer response, with said particular server-layer characteristics including at least one relaxed server-layer characteristic of said first server-layer characteristics. One embodiment establishes, in response a client-layer request to the server-layer network responsive to the positive server-layer response, a server-layer path between said two client-layer devices that satisfies said particular server-layer characteristics, but does not satisfy said first server-layer characteristics.

19 Claims, 5 Drawing Sheets

(56) References Cited

OTHER PUBLICATIONS

Le Roux et al., "Encoding of Objective Functions in the Path Computation Element Communication Protocol (PCEP)," FC 5541, The Internet Society, Reston, VA, USA, Jun. 2009 (twenty-three pages).
Oki et al., "A Disjoint Path Selection Scheme With Shared Risk Link Groups in GMPLS Networks," IEEE Communications Letters, vol. 6, No. 9, Sep. 2002, IEEE, New York, New York (three pages).
Xu et al., "SRLG-Diverse Routing of Multiple Circuits in a Heterogeneous Optical Transport Network," Design of Reliable Communication Networks (DRCN), 2011 8th International Workshop, Oct. 10-12, 2011, IEEE, New York, New York (eight pages).
Duroyon et al., "G.LSP Service Model framework in an Optical G-MPLS network," <draft-duroyon-te-ip-optical-01.txt>, The Internet Society, Reston, VA, USA, Nov. 2000 (eighteen pages).
Papadimitriou and Jones, "Enhanced LSP Services in Optical Networks," draft-papadimitriou-enhanced-lsps-04.txt, The Internet Society, Reston, VA, USA, Jul. 2001 (thirty-one pages).

\* cited by examiner

SERVER-LAYER PATH NEGOTIATION BETWEEN CLIENT AND SERVER NETWORK LAYERS

TECHNICAL FIELD

The present disclosure relates generally to forwarding packets in a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Reliably communicating information in a network is important. Different techniques may be employed in a network to communicate packets in a network when the topology of the network changes, such as when a path over which certain packets are forwarded becomes unavailable.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
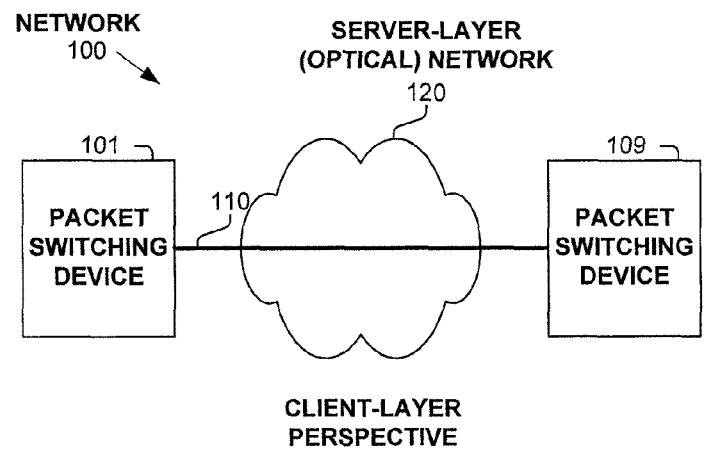
FIGS. 1A-B illustrate a network operating according to one embodiment.

Disclosed are, inter alia, methods, apparatus, computer-storage media, mechanisms, and means associated with server-layer path negotiation between client and server network layers. One embodiment includes negotiating between a client-layer network and a server-layer network related to establishing a server-layer path between two client-layer devices. In one embodiment, this negotiation includes a first iteration of a client-layer request of one or more first server-layer characteristics followed by a negative server-layer response, and a subsequent iteration of a particular client-layer request of one or more particular server-layer characteristics followed by a positive server-layer response, with said particular server-layer characteristics including at least one relaxed server-layer characteristic of said first server-layer characteristics. One embodiment establishes, in response a client-layer request to the server-layer network responsive to the positive server-layer response, a server-layer path between said two client-layer devices that satisfies said particular server-layer characteristics, but does not satisfy said first server-layer characteristics.

One embodiment determines one or more second particular server-layer characteristics that are more relaxed than said particular server-layer characteristics in preparation for replacing the server-layer path; and the client-layer network negotiates with the server-layer network related to replacing the server-layer path between said two client-layer devices, which includes an initial replacement client-layer request of said second particular server-layer characteristics (which may be the only client-layer request needed).

In one embodiment, these server-layer characteristics include a latency, bandwidth, Shared Risk Link Group (SRLG), and/or cost requirement. In one embodiment, this negotiation is performed in response to a failure of a previously established server-layer path between said two client-layer devices. In one embodiment, each of the two client-layer devices is a Layer-3 or Layer-2 packet switching device. In one embodiment, the server-layer is an optical network.

2. Description

Disclosed are, inter alia, methods, apparatus, computer-storage media, mechanisms, and means associated with server-layer path negotiation between client and server network layers. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing said read value—the value is obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment includes, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

As used herein, a server-layer Shared Link Risk Group (SRLG) refers to a set of one or more things in the server network that will fail together, with these things being links, devices, nodes, etc. For example, an SRLG may be a device, such as a switch, repeater, regenerator, link, etc. Two links that traverse a same single point of failure (e.g., are wavelengths within a same fiber, are in different fibers that are co-located such as within a same conduit, or run under a same building such as they would both fail upon building collapse). Further, as used herein, server-layer characteristics refer to the transport characteristics of a path (e.g., latency, bandwidth, Shared Risk Link Group (SRLG), cost, etc.), and server-layer characteristics does not refer to a source or destination within a server or client network.

One embodiment provides a reduced-cost approach to optical network restoration of links between client-layer devices, such as, but not limited to, Internet Protocol (IP) routers. One embodiment uses the same router interfaces and dense wavelength division multiplexing (DWDM) transponders that were used for the original working path.

In one embodiment, both the client and server layers are designed to protect traffic. In one embodiment, the client layer is dimensioned so that it quickly protects all traffic until server-layer restoration kicks in. In one embodiment, the client layer is dimensioned so that it quickly protects only a portion of traffic until server-layer restoration kicks in. This second approach requires less over-engineering of the server-layer network and client-layer network; and hence, a reduced cost of the server-layer network and client-layer network.

For example, if a fraction of (high priority) traffic requires fast protection and the rest of the traffic can tolerate slower re-convergence of several seconds or even minutes (as is often the case in real server-layer networks), then the client layer must only be dimensioned for protecting these high priority services. The rest of the traffic may still be protected by the client-layer network, but on a best-effort basis.

One embodiment provides for server-layer restoration without requiring extra client-to-server-layer interfaces or server layer equipment, which allows less over-engineering within the server-layer network. For example, one embodiment provides for restoration using the same interfaces of packet switching devices and optical transponders, so the extra cost of optical restoration is the amortized cost of using DWDM wavelengths in reconfigurable optical add-drop multiplexers (ROADMs) and amplifiers, which may be a very low extra cost in small to medium haul networks that do not require regeneration.

Any restoration path through a server-layer network may not be sufficient to satisfy the communications requirements, especially when a network is not over-engineered for end-to-end protection switching. For example, the restoration path may not be useful if it introduces very high latency. It may also be important to ensure the server-layer restoration path is still diverse from paths implementing other client-layer links; otherwise a second failure may affect the link that uses the restoration path as well as the other client-layer links that it is protecting. Assuming that the restoration path has the exact same constraints as the original working path may have its own problems. While this approach guarantees that the restoration path will be good, it presents a different issue: at the time of failure, the constraints imposed for the original working path may be too stringent, resulting in the inability to find a restoration path that satisfies the required server-layer characteristics.

One embodiment allows the client-layer network to negotiate with the server-layer network to establish a restoration path, possibly with different constraints than the original path. For example in one application, latency requirements may be more important than bandwidth requirements; while in another application, the opposite may be true. Thus, the client-layer may prefer different server-layer paths to satisfy different needs.

In one embodiment, the client-layer network negotiates with the server-layer network to establish a restoration path. Examples of this negotiation include, but are not limited to, the client-layer requesting a path with latency<X, cost<Y, while avoiding SRLGs {A,B}. The client-layer first requests for a path with the same server-layer characteristics as the original path; if the server-layer network cannot satisfy the request, it notifies the client-layer network that no such path exists. The client-layer network now relaxes one or more constraints, if such a path can be established the server-layer network establishes it; otherwise, this negotiation between the client and server network layers continues.

In one embodiment, the restoration process involves multiple steps including interaction between the client and server layers. Typically, in response to a failure, the client layer may use its own layer protection to send traffic over established client-layer links. For example, Multiprotocol Label Switching Traffic Engineering Fast Reroute (MPLS-TE FRR) and Interior Gateway Protocol (IGP) convergence are two such mechanisms used in a Layer-3 client network. At peak demand, there may not be sufficient bandwidth to support all working and protect traffic. Therefore, low-priority traffic may be lost or communicated at a best effort.

In one embodiment, the client determines which paths through the server-layer network should be restored. For each such path, a negotiation process is performed. The server layer establishes the path, resulting in the client-layer link being established. For example, an optical network may use Resource Reservation Protocol (RSVP).

When the client layer detects that the failed link is reestablished (e.g., over the same or a replacement server-layer path), the client-layer network will often re-converge, and will move traffic back on the path in a hitless transition (if possible). Not all traffic that used the original path will necessarily use the restored path, as, for example, latency sensitive traffic may have to avoid the restored path in the event that the negotiated latency is higher.

In one embodiment, when the original server-layer connection is repaired, the client layer might not become aware of it directly, as the interface is now connected to the negotiated new path. A re-optimization process may occur in the server-layer network to now use the repaired original path. It is desirable for communications to occur between the client and server layers so this re-optimization process can be performed in a hitless manner. In one embodiment, traffic is moved from the to-be-rerouted path to a temporary alternate route in the client-layer network, then the server-layer path is rerouted, and then client-layer traffic restored to this re-optimized server-layer path.

One embodiment includes a method, comprising: negotiating between a client-layer network and a server-layer network related to establishing a server-layer path between two client-layer devices, including a first iteration of a client-layer request of one or more first server-layer characteristics followed by a negative server-layer response, and a subsequent iteration of a particular client-layer request of one or more particular server-layer characteristics followed by a positive server-layer response, with said particular server-layer characteristics including at least one relaxed server-layer characteristic of said first server-layer characteristics; and establishing, in response a client-layer request to the server-layer network responsive to the positive server-layer response, a server-layer path between said two client-layer devices that satisfies said particular server-layer characteristics, but does not satisfy said first server-layer characteristics.

In one embodiment, said particular server-layer characteristics include a latency requirement that is not as stringent as a latency requirement of said first server-layer characteristics; and wherein the server-layer path said established between said two client-layer devices satisfies said latency requirement of the particular server-layer characteristics but not said latency requirement of the first server-layer characteristics. In one embodiment, said particular server-layer characteristics include a bandwidth requirement that is not as great as a bandwidth requirement of said first server-layer characteristics; and wherein the server-layer path said established between said two client-layer devices satisfies said bandwidth requirement of the particular server-layer characteristics but not said bandwidth requirement of the first server-layer characteristics. In one embodiment, said particular server-layer characteristics include a Shared Risk Link Group (SRLG) requirement that is not as stringent as a SRLG requirement of said first server-layer characteristics; and wherein the server-layer path said established between said two client-layer devices satisfies said SRLG requirement of the particular server-layer characteristics but not said SRLG requirement of the first server-layer characteristics. In one embodiment, said particular server-layer characteristics include a cost requirement that is not as low as a cost requirement of said first server-layer characteristics; and wherein the server-layer path said established between said two client-layer devices satisfies said cost requirement of the particular server-layer characteristics but not said cost requirement of the first server-layer characteristics.

In one embodiment, said negotiation is performed in response to a failure of a previously established server-layer path between said two client-layer devices. In one embodiment, said negotiation is performed in response to an initial request to establish a server-layer path between said two client-layer devices. In one embodiment, said negotiating by the client-layer network is performed by one of said two client-layer devices. In one embodiment, each of the two client-layer devices is a Layer-3 or Layer-2 packet switching device. In one embodiment, the server-layer is an optical network. In one embodiment, the server-layer is an optical network. In one embodiment, said one or more first server-layer characteristics and said one or more particular server-layer characteristics are characteristics in a predetermined order of characteristics to request by the client-layer network of the server-layer network.

In one embodiment, the negative server-layer response includes a specification of one or more server-layer characteristics of a path between said two client devices that the server-layer network can provide; and wherein the method includes determining, by client-layer, said particular server-layer characteristics based on said server-layer characteristics included in the negative server-layer response. In one embodiment, said one or more server-layer characteristics included in the negative server-layer response includes at least two server-layer characteristics. In one embodiment, said one or more server-layer characteristics included in the negative server-layer response includes specifying at least two server-layer characteristics for each of a plurality of possible server-layer paths between said two client devices. In one embodiment, the server-layer is an optical network.

One embodiment includes: determining one or more second particular server-layer characteristics that are more relaxed than said particular server-layer characteristics in preparation for replacing the server-layer path; and negotiating between the client-layer network and the server-layer network related to replacing the server-layer path between said two client-layer devices, including an initial replacement client-layer request of said second particular server-layer characteristics. In one embodiment, One embodiment includes a method, comprising: establishing a server-layer path in a server-layer network that satisfies one or more particular server-layer characteristics between two client-layer devices in a client-layer network; determining one or more second particular server-layer characteristics that are more relaxed than said particular server-layer characteristics in preparation for replacing the server-layer path; and negotiating between the client-layer network and the server-layer network related to replacing the server-layer path between said two client-layer devices, including an initial replacement client-layer request of said second particular server-layer characteristics. In one embodiment, said determining said second particular server-layer characteristics and said negotiation operation is performed in response to a failure of the server-layer path.

One embodiment includes a packet switching device, comprising: one or more processing elements; memory; a plurality of interfaces configured to send and receive packets; and one or more packet switching mechanisms configured to switch packets among said interfaces. In one embodiment, said one or more processing elements are configured to perform operations, including: sending a specific request to a server-layer network requesting a path between the packet switching device and a second packet switching device through the server-layer network with one or more first server-layer characteristics, and in response, receiving a negative server-layer response; responsive to said received negative server-layer response, sending a particular request to the server-layer network requesting a path between said two client-layer devices through the server-layer network with one or more particular server-layer characteristics, and in response, receiving a positive server-layer response; and sending a plurality of packets over a particular path through the server-layer network established in response to the particular request. In one embodiment, the server-layer network is an optical network.

One embodiment includes an optical device, comprising: one or more processing elements; memory; a plurality of optical interfaces configured to send and receive optical frames; and one or more optical mechanisms configured to communicate optical frames among said interfaces. In one embodiment, said one or more processing elements are configured to perform operations, including: sending a specific negative optical response to a client-layer network request for a path between two client-layer devices through the optical network with one or more specific optical characteristics that an optical network cannot currently provide; subsequent to said sending the specific negative optical response, sending a particular positive optical response to the client-layer network request for a path between said two client-layer devices through the optical network with one or more particular optical characteristics that the optical network can currently provide; and signaling within the optical network in establishing a particular path through the optical network between said two client-layer devices, with the particular path satisfying said one or more particular optical characteristics. In one embodiment, the first negative optical response includes a plurality of optical characteristics of a path that the optical network can provide between said two client-layer devices, wherein the plurality of optical characteristics include said one or more particular optical characteristics.

Expressly turning to the figures, FIG. 1A illustrates a network 100 including client layer devices (e.g., packet switching devices 101 and 109) and a server-layer network (e.g., optical or other network providing communications services to the client-layer devices). FIG. 1A is shown from the client-layer perspective, that is, packet switching devices 101 and 109 view that there is a client-layer link 110 between them (provided by server-network 120). Note, there typically is more than one client path through the client-layer network between packet switching devices 101 and 109, but are not shown to allow the reader to focus on the negotiation between the client and server layers in establishing an initial or replacement path through the server-layer network.

Figure 1B:
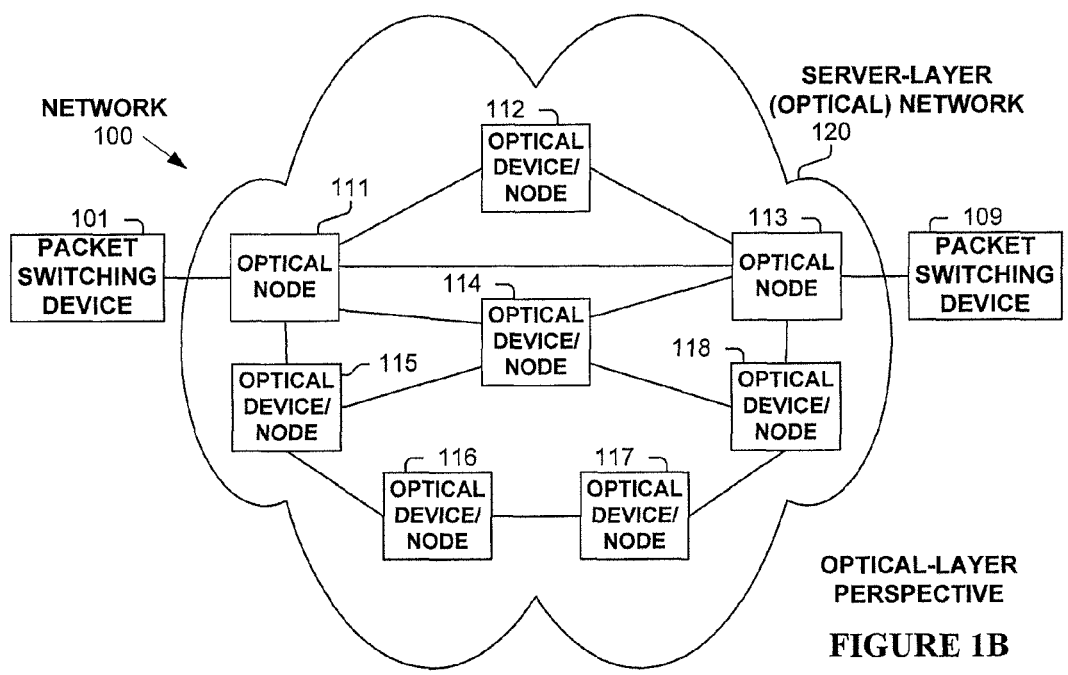

FIG. 1B shows network 100 of FIG. 1A with more details about server-layer network 120 of one embodiment. As shown, server-layer (e.g., optical) network 120 includes optical nodes and devices 111-118. The use of the phrase "nodes/devices" is to indicate that some of these appliances may include a processing capability (e.g., an optical node) or an optical device (e.g., optical regenerators, cross-connects, transponders). The shown client-layer network includes packet switching devices 101-109.

Server-layer network 120 illustrates numerous server-layer paths between client-layer devices 101 and 109. Each of these paths has server-layer characteristics of their respective capabilities, including, but not limited to, bandwidth, latency, cost, and which SRLGs to which it belongs. One embodiment allows the client-layer network (e.g., packet switching device 101 or 109, a client-layer link/path computation engine, a client-layer network management system) to negotiate with the server-layer network (e.g., an optical node 111-118, a server-layer path computation engine, a server-layer network management system).

Figure 1C:
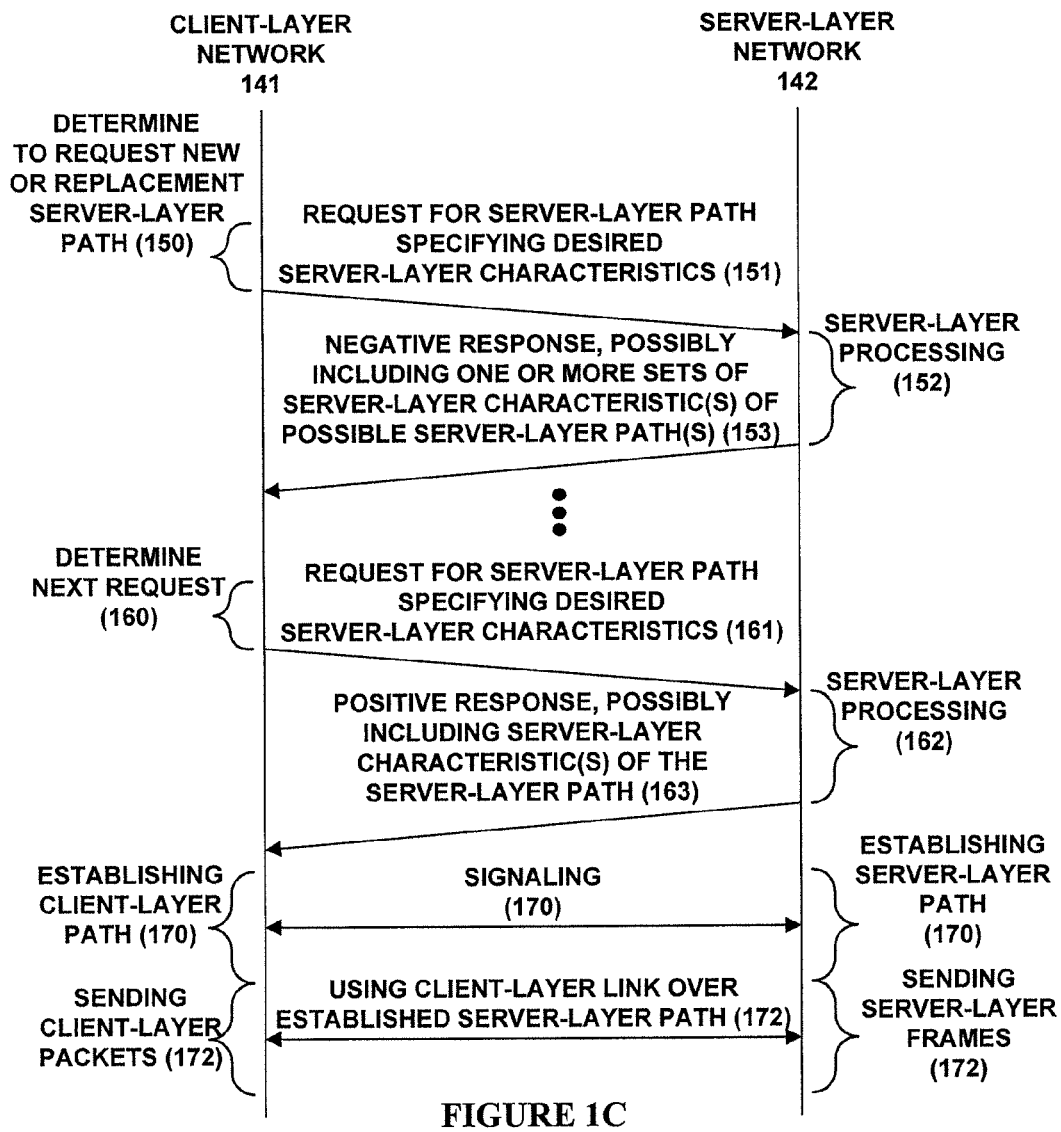
FIG. 1C illustrates a network operating according to one embodiment.

FIG. 1C illustrates client-driven, client-server layer network negotiation performed in one embodiment. Client-layer network 141 determines (150) to request a new or replacement server-layer path. Client-layer network 141 sends (151) this request to the server-layer network 142, with the request including one or more server-layer required and/or optional characteristics of the requested server-layer path. Server-layer network 142 processes (152) the request, determining that it cannot provide a path with the required characteristics. Server-layer network 142 communicates (153) this negative response to client-layer network 141. In one embodiment, this negative response includes a set of server-layer characteristics for each of one or more paths that server-layer network 142 can currently provide. As indicated by the dots, this iterative process can continue for multiple iterations. In one embodiment, the operations of client-layer network 141 are performed by one of the two client-layer devices which are being communicatively-coupled over the server-layer path. In one embodiment, the operations of server-layer network 142 are performed by an optical node directly communicatively coupled to the client-layer network 141.

Client-layer network 141 determines (160) a next request, such as the next set of server-layer characteristics from a predetermined sequence (e.g., defined by an operator, network manager, etc.), and responsive to any communicated (153) sets of server-layer characteristics of paths that server-layer network 142 can provide. Client-layer network sends (161) this next request to server-layer network 142. After some processing (162), server-layer network 142 communicates (163) to client-layer network 141 a positive response indicating that the path with the desired server-layer characteristics can be provided (and possibly communicating the actual server-layer characteristics of the server-layer path). Server-layer network 142 and client-layer network 141 signal and establish (170) their respective layer path/link, and then communicate (172) over this client-layer link over the established server-layer path.

Figure 1D:
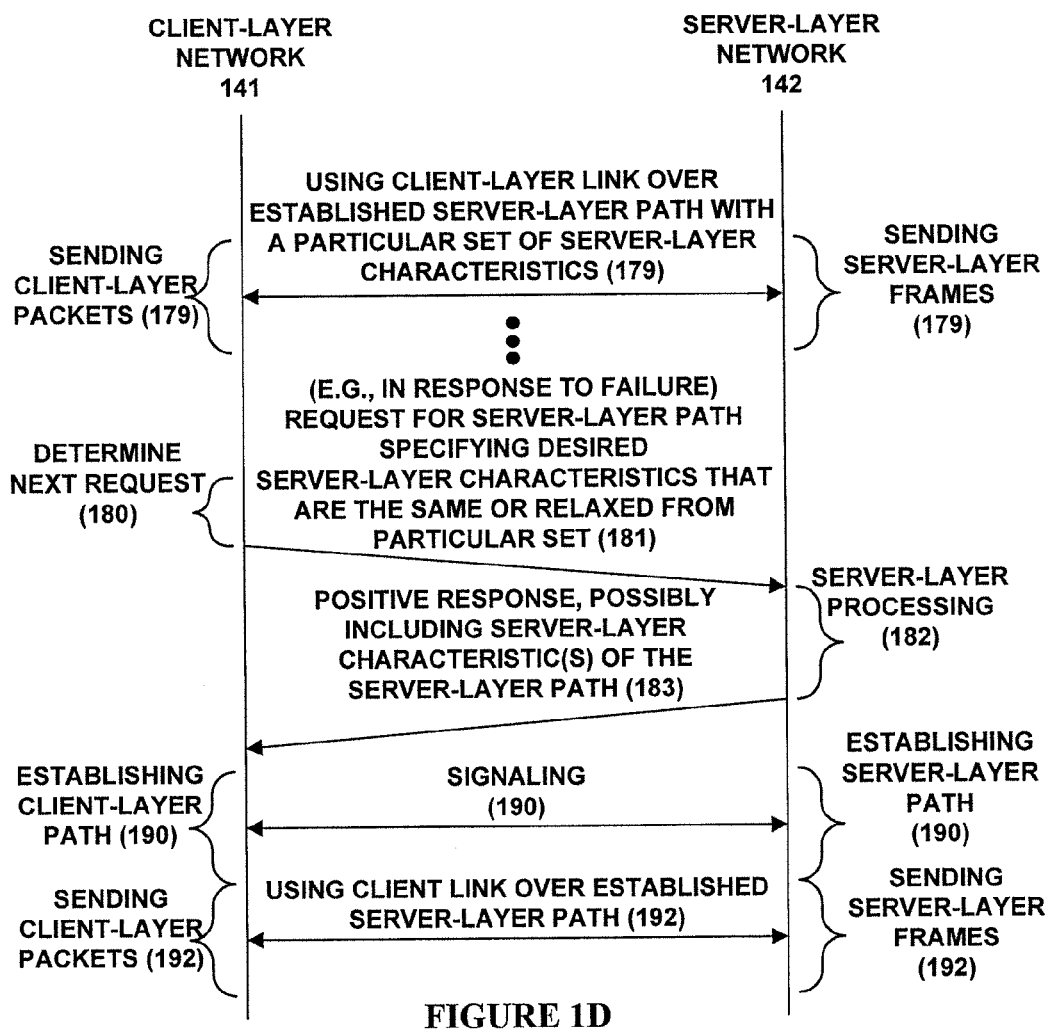
FIG. 1D illustrates a network operating according to one embodiment.

FIG. 1D illustrates client-driven, client-server layer network negotiation performed in one embodiment. A server-layer path is established over which a client-layer path communicates (179). This server-layer path has one or more particular server-layer characteristics associated with it. In one embodiment, a process such as, but not limited to that described herein (possibly in regards to FIGS. 1C and/or 3) is used to establish the server-layer path between the two client-layer devices. In one embodiment, the operations of client-layer network 141 are performed by one of the two client-layer devices which are being communicatively-coupled over the server-layer path. In one embodiment, the operations of server-layer network 142 are performed by an optical node directly communicatively coupled to the client-layer network 141.

Client-layer network 141 determines (180) to request a replacement server-layer path (e.g., in response to an actual or anticipated failure, degradation, etc., of the existing server-layer path). This established path had/has one or more particular server-layer characteristics associated with it. Typically, client-layer network 141 will request a best possible path through server-layer network 142 (with client-layer network 141 defining what is "best" by its selection of server-layer characteristics). Therefore, the previously established path was one of the best paths that could be provided by server-layer network 142. In order to prevent multiple negotiation iterations especially when restoration time is important, client-layer network 141 determines a new set of desired server-layer characteristics that are more relaxed than the one or more particular server-layer characteristics, and communicates (181) these to the server-layer network. In one embodiment, these server-layer characteristics are the same as the one or more particular server-layer characteristics (as there might be another path with these same server-layer characteristics, but probably not a better path).

Client-layer network 141 sends (181) this request to the server-layer network 142, with the request including these relaxed one or more server-layer required and/or optional characteristics of the requested server-layer path. Server-layer network 142 processes (182) the request, and then communicates (183) to client-layer network 141 a positive response indicating that the path with the desired relaxed server-layer characteristics can be provided (and possibly communicating the actual server-layer characteristics of the server-layer path). Server-layer network 142 and client-layer network 141 signal and establish (190) their respective layer path/link, and then communicate (192) over this client-layer link over the established server-layer path.

Figure 2A:
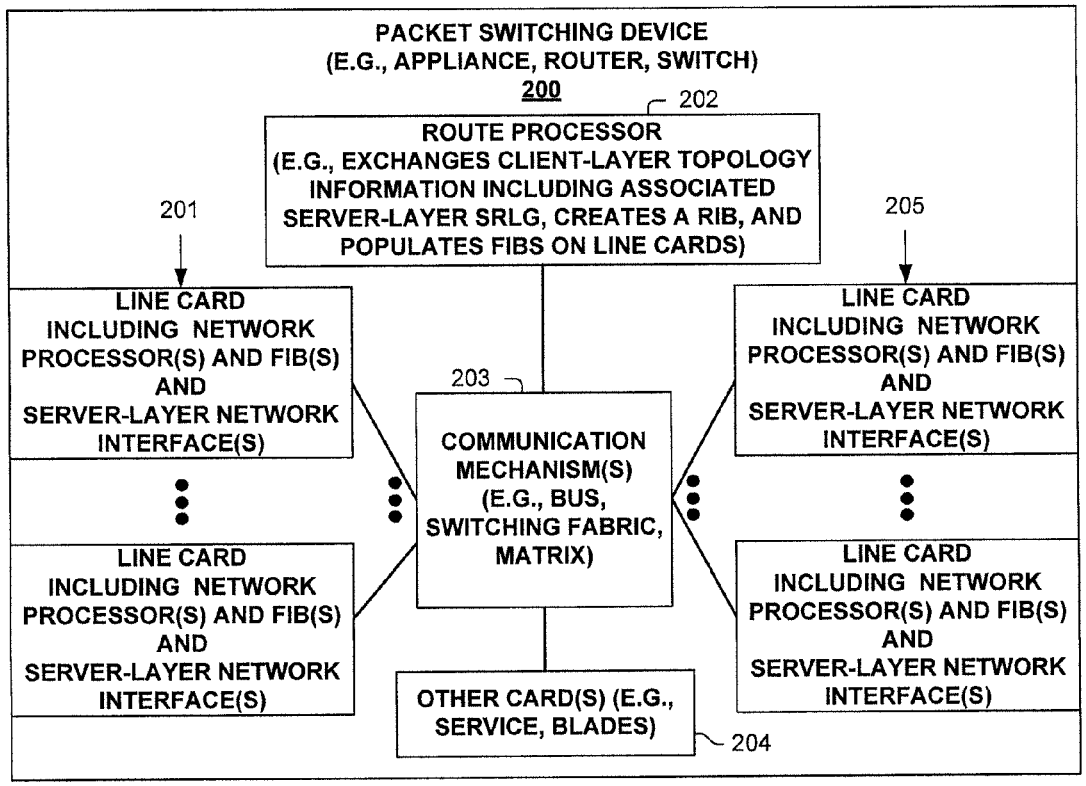
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., coupled to a server-layer network such as an optical network), and with one or more processing elements that are used in one embodiment associated with server-layer path negotiation between client and server network layers. Packet switching device 200 also has a control plane with one or more processing elements 202 for managing the control plane and/or control plane processing of packets associated with server-layer path negotiation between client and server network layers. Packet switching device 200 also includes other cards 204 (e.g., service cards, blades) which include processing elements that are used in one embodiment to process packets associated with server-layer path negotiation between client and server network layers, and some communication mechanism 203 (e.g., bus, switching fabric, matrix) for allowing its different entities 201, 202, 204 and 205 to communicate.

Figure 2B:
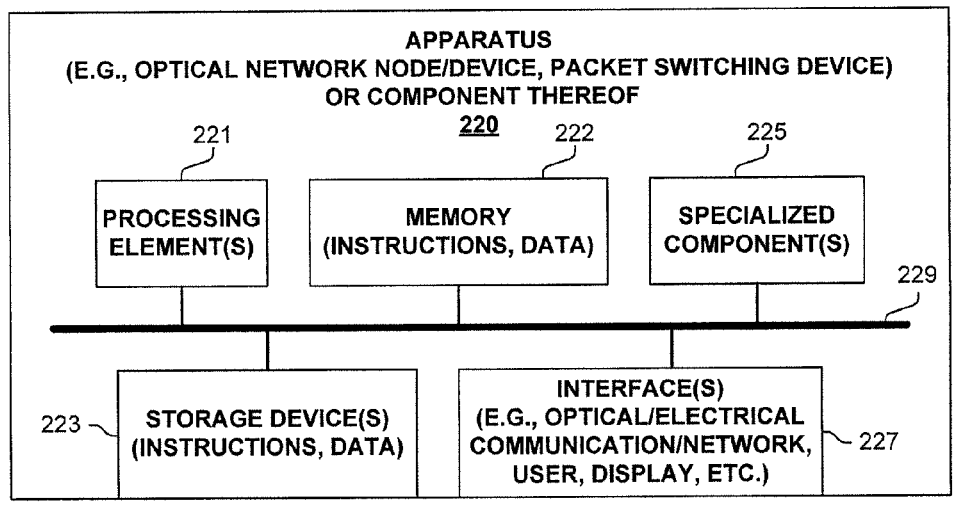
FIG. 2B illustrates an apparatus according to one embodiment.

FIG. 2B is a block diagram of an apparatus 220 (e.g., node, device, path computation engine, network management device) used in one embodiment associated with server-layer path negotiation between client and server network layers. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3:
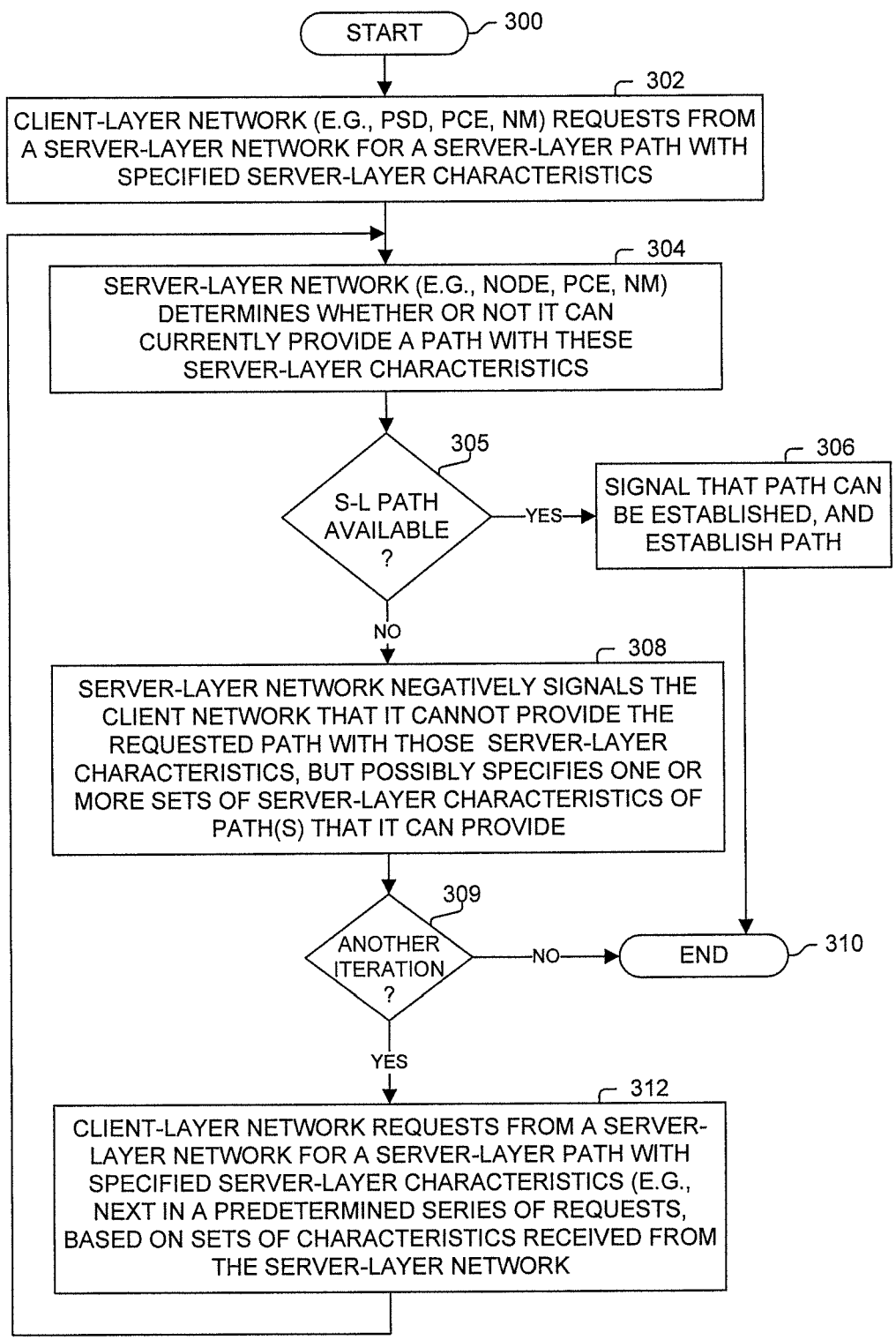
FIG. 3 illustrates a process according to one embodiment.

FIG. 3 illustrates a process performed in one embodiment. Processing begins with process block 300. In process block 302, the client-layer network (e.g., via a packet switching device, path computation engine, network manager) requests from a server-layer network a path between two or more client devices, including specifying required and/or optional server-layer characteristics (e.g., latency, bandwidth, SRLG, cost) of the desired server-layer path.

In process block 304, the server-layer network (e.g., via a node, path computation engine, network manager) determines whether or not it can currently provide such a path with the specified required server-layer characteristics. As determined in process block 305, if such a path can be provided, then in process block 306, the server-layer path is established, and processing of the flow diagram of FIG. 3 is complete as indicated by process block 310. As determined in process block 305, if such a path cannot be provided, then in process block 308, the server-layer network signals to the client-layer network a corresponding negative response. In one embodiment, this negative response includes a set of one or more server-layer characteristics of one or more paths that the server-layer network can currently provide.

As determined in process block 309, if the client-layer network determines to stop trying to establish a server-layer connection, then processing of the flow diagram of FIG. 3 is complete as indicated by process block 310. Otherwise, if in process block 309, the client-layer determines to perform another request iteration, then in process block 312, the client-layer network requests from the server-layer network a path with specified server-layer characteristics, typically with one or more relaxed requested server-layer characteristics (as the server-layer network could not provide a path with more stringent server-layer characteristics in a previous iteration). This request could be based on a predetermined order (e.g., previously specified, or computed based on a predetermined method) and/or received sets of characteristics of paths which the server-layer network can provide. Processing returns to process block 304.

In one embodiment, detecting a communications failure of a server-layer path, a client-layer device may wait to see if it receives an error notification from the server-layer network. If it receives such a notification, the client-layer network requests a new path, such as described herein especially in regards to FIGS. 1C and 3. However, if no such notification is timely received, in one embodiment, the client-layer network requests a restoration path that is divergent from the path of the failed path. In one embodiment, the client-layer network requests information (e.g., SRLGs) of the failed path, and then requests a new path with server-layer characteristics avoiding the SRLGs of the failed path, such as described herein especially in regards to FIGS. 1C, 1D and 3.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    negotiating between a client-layer network and a server-layer network related to establishing a server-layer path between two client-layer devices, including:
        a first iteration of a client-layer request of one or more first server-layer characteristics followed by a negative server-layer response, wherein the negative server-layer response includes a specification of one or more server-layer characteristics of a path between said two client devices that the server-layer network can provide;
        determining, by the client-layer, one or more particular server-layer characteristics based on said server-layer characteristics included in the negative server-layer response; and
        a subsequent iteration of a particular client-layer request of said particular server-layer characteristics followed by a positive server-layer response, with said particular server-layer characteristics including at least one relaxed server-layer characteristic of said first server-layer characteristics, wherein the relaxed server-layer characteristic of said first server-layer characteristic includes a bandwidth requirement lesser than a bandwidth specified in said one or more first server-layer characteristics, a latency requirement longer than a latency requirement specified in said one or more first server-layer characteristics, a Shared Link Risk Group (SRLG) requirement having fewer links, devices, or nodes than an SRLG requirement specified in said one or more first server-layer characteristics, or a cost requirement greater than a cost requirement specified in said one or more first server-layer characteristics; and
    establishing, in response to a client-layer request to the server-layer network responsive to the positive server-layer response, a server-layer path between said two client-layer devices that satisfies said particular server-layer characteristics, but does not satisfy said first server-layer characteristics.

2. The method of claim 1, wherein said particular server-layer characteristics include a latency requirement that is not as stringent as a latency requirement of said first server-layer characteristics; and wherein the server-layer path established between said two client-layer devices satisfies said latency requirement of the particular server-layer characteristics but not said latency requirement of the first server-layer characteristics.

3. The method of claim 2, wherein said particular server-layer characteristics include a Shared Risk Link Group (SRLG) requirement that is not as stringent as a SRLG requirement of said first server-layer characteristics; and wherein the server-layer path established between said two client-layer devices satisfies said SRLG requirement of the particular server-layer characteristics but not said SRLG requirement of the first server-layer characteristics.

4. The method of claim 1, wherein said particular server-layer characteristics include a bandwidth requirement that is not as great as a bandwidth requirement of said first server-layer characteristics; and wherein the server-layer path established between said two client-layer devices satisfies said bandwidth requirement of the particular server-layer characteristics but not said bandwidth requirement of the first server-layer characteristics.

5. The method of claim 1, wherein said particular server-layer characteristics include a Shared Risk Link Group (SRLG) requirement that is not as stringent as a SRLG requirement of said first server-layer characteristics; and wherein the server-layer path established between said two client-layer devices satisfies said SRLG requirement of the particular server-layer characteristics but not said SRLG requirement of the first server-layer characteristics.

6. The method of claim 1, wherein said particular server-layer characteristics include a cost requirement that is not as low as a cost requirement of said first server-layer characteristics; and wherein the server-layer path established between said two client-layer devices satisfies said cost requirement of the particular server-layer characteristics but not said cost requirement of the first server-layer characteristics.

7. The method of claim 1, wherein said negotiation is performed in response to a failure of a previously established server-layer path between said two client-layer devices.

8. The method of claim 1, wherein said negotiation is performed in response to an initial request to establish a server-layer path between said two client-layer devices.

9. The method of claim 1, wherein said negotiating by the client-layer network is performed by one of said two client-layer devices.

10. The method of claim 1, wherein each of the two client-layer devices is a Layer-3 or Layer-2 packet switching device.

11. The method of claim 10, wherein the server-layer is an optical network.

12. The method of claim 1, wherein the server-layer is an optical network.

13. The method of claim 1, wherein said one or more first server-layer characteristics and said one or more particular server-layer characteristics are characteristics in a predetermined order of characteristics to request by the client-layer network of the server-layer network.

14. The method of claim 1, comprising:
    determining one or more second particular server-layer characteristics that are more relaxed than said particular server-layer characteristics in preparation for replacing the server-layer path; and
    negotiating between the client-layer network and the server-layer network related to replacing the server-layer path between said two client-layer devices, including an initial replacement client-layer request of said second particular server-layer characteristics.

15. A packet switching device, comprising:
    one or more processing elements;
    memory;
    a plurality of interfaces configured to send and receive packets; and
    one or more packet switching mechanisms configured to switch packets among said interfaces;
    wherein said one or more processing elements are configured to perform operations, including:
        sending a specific request to a server-layer network requesting a path between the packet switching device and a second packet switching device through the server-layer network with one or more first server-layer characteristics, and in response, receiving a negative server-layer response specifying one or more server-layer network characteristics of a path between the packet switching device and the second packet switching device that the server-layer network can or cannot provide;
        responsive to said received negative server-layer response, sending a particular request to the server-layer network requesting a path between said two client-layer devices through the server-layer network with one or more relaxed particular server-layer characteristics, wherein said one or more relaxed particular server-layer characteristics includes a bandwidth requirement lesser than a bandwidth specified in said first server-layer characteristics, a latency requirement longer than a latency requirement specified in said first server-layer characteristics, a Shared Link Risk Group (SRLG) requirement having fewer links, devices, or nodes than an SRLG requirement specified in said first server-layer characteristics, or a cost requirement greater than a cost requirement specified in said first server-layer characteristics, and in response, receiving a positive server-layer response; and sending a plurality of packets over a particular path through the server-layer network established in response to the particular request.

16. The packet switching device of claim 15, wherein the server-layer network is an optical network.

17. An optical device, comprising:
one or more processing elements;
memory;
a plurality of optical interfaces configured to send and receive optical frames; and
one or more optical mechanisms configured to communicate optical frames among said interfaces;
wherein said one or more processing elements are configured to perform operations, including:
sending a specific negative optical response to a client-layer network request for a path between two client-layer devices through the optical network with one or more specific optical characteristics that an optical network cannot currently provide;
subsequent to said sending the specific negative optical response, sending a particular positive optical response to the client-layer network request for a path between said two client-layer devices through the optical network with one or more relaxed particular optical characteristics that the optical network can currently provide, wherein said one or more relaxed particular optical characteristics includes a bandwidth requirement lesser than a bandwidth specified in said specific optical characteristics, a latency requirement longer than a latency requirement specified in said specific optical characteristics, a Shared Link Risk Group (SRLG) requirement having fewer links, devices, or nodes than an SRLG requirement specified in said specific optical characteristics, or a cost requirement greater than a cost requirement specified in said specific optical characteristics; and signaling within the optical network in establishing a particular path through the optical network between said two client-layer devices, with the particular path satisfying said one or more relaxed particular optical characteristics.

18. The optical device of claim 17, wherein the first negative optical response includes a plurality of optical characteristics of a path that the optical network can provide between said two client-layer devices, wherein the plurality of optical characteristics include said one or more particular optical characteristics.

19. The optical device of claim 17, wherein said relaxed particular server-layer characteristics include a Shared Risk Link Group (SRLG) requirement that is not as stringent as a SRLG requirement of said specific optical characteristics; and wherein the particular path established between said two client-layer devices satisfies said SRLG requirement of said relaxed particular server-layer characteristics but not said SRLG requirement of said specific optical characteristics.

* * * * *